(12) United States Patent
He

(10) Patent No.: US 9,989,693 B2
(45) Date of Patent: Jun. 5, 2018

(54) DOUBLE-SIDED LIQUID CRYSTAL DISPLAY DEVICE AND BACKLIGHT MODULE THEREOF

(71) Applicant: Shenzhen China Star Optoelectronics Technology Co., Ltd., Shenzhen (CN)

(72) Inventor: Hu He, Shenzhen (CN)

(73) Assignee: Shenzhen China Star Optoelectronics Technology Co., Ltd., Shenzhen, Guangdong (CN)

( * ) Notice: Subject to any disclaimer, the term of this patent is extended or adjusted under 35 U.S.C. 154(b) by 246 days.

(21) Appl. No.: 14/914,176

(22) PCT Filed: Jan. 12, 2016

(86) PCT No.: PCT/CN2016/070638
§ 371 (c)(1),
(2) Date: Feb. 24, 2016

(87) PCT Pub. No.: WO2017/067099
PCT Pub. Date: Apr. 27, 2014

(65) Prior Publication Data
US 2017/0261679 A1 Sep. 14, 2017

(30) Foreign Application Priority Data
Oct. 20, 2015 (CN) .......................... 2015 1 0683058

(51) Int. Cl.
*G02F 1/13357* (2006.01)
*G02F 1/1335* (2006.01)
(Continued)

(52) U.S. Cl.
CPC .......... *G02B 6/0055* (2013.01); *G02B 6/0053* (2013.01); *G02F 1/133528* (2013.01);
(Continued)

(58) Field of Classification Search
None
See application file for complete search history.

(56) References Cited

U.S. PATENT DOCUMENTS

2004/0001173 A1* 1/2004 Yamauchi ........... G02F 1/13471
349/113
2004/0189902 A1 9/2004 Kim et al.
(Continued)

FOREIGN PATENT DOCUMENTS

CN 1959498 5/2007
CN 1963596 5/2007
(Continued)

OTHER PUBLICATIONS

International Search Report for PCT/CN2016/070638, Completed by the Chinese Patent Office, dated Jul. 20, 2016, 13 Pages.

*Primary Examiner* — Ryan Crockett
(74) *Attorney, Agent, or Firm* — Mintz Levin Cohn Ferris Glovsky and Popeo, P.C.; Kongsik Kim; Jhongwoo Peck

(57) ABSTRACT

A double-sided liquid crystal display device is provided, which includes a light guide plate, a light source, a first liquid crystal panel, a second liquid crystal panel and a reflective Dual Brightness Enhancement Film (DBEF). The light guide plate has a light incident side, a first light exit surface and a second light exit surface. The light source is disposed adjacent to the light incident side. The first liquid crystal panel is disposed opposite to the first light exit surface, and a first lower polarizer of the first liquid crystal panel faces the first light exit surface. The DBEF is disposed between the first lower polarizer and the first light exit surface, and a direction of light transmission axis of DBEF is in parallel with that of the first lower polarizer, and the direction of light transmission axis of DBEF is perpendicular to that of the second upper polarizer.

17 Claims, 2 Drawing Sheets

(51) Int. Cl.
  *F21V 8/00* (2006.01)
  *G02F 1/1333* (2006.01)
(52) U.S. Cl.
  CPC ............. *G02B 6/0068* (2013.01); *G02F 2001/133342* (2013.01); *G02F 2001/133538* (2013.01)

(56) References Cited

U.S. PATENT DOCUMENTS

| | | | | |
|---|---|---|---|---|
| 2005/0041179 | A1* | 2/2005 | Suzuki | G02F 1/133536 349/74 |
| 2009/0316082 | A1 | 12/2009 | Bae et al. | |
| 2016/0187724 | A1* | 6/2016 | Masuda | G02B 6/0056 349/65 |

FOREIGN PATENT DOCUMENTS

| | | |
|---|---|---|
| CN | 101644852 | 2/2010 |
| CN | 105223731 | 1/2016 |

* cited by examiner

DOUBLE-SIDED LIQUID CRYSTAL DISPLAY DEVICE AND BACKLIGHT MODULE THEREOF

CROSS-REFERENCE TO RELATED APPLICATION

This application is the U.S. national phase of PCT Application No. PCT/CN2016/070638 filed on Jan. 12, 2016, which claims priority to CN Patent Application No. 201510683058.5 filed on Oct. 20, 2015, the disclosures of which are incorporated in their entirety by reference herein.

TECHNICAL FIELD

The present disclosure relates to the field of Liquid Crystal Display techniques, and in particular to a dual-sided liquid crystal display device and its backlight module.

BACKGROUND ARTS

With development of photoelectricity and semiconductor technology which has led to a growth in the booming of flat panel display. Liquid Crystal Display (LCD for short) in numerals flat display panels has been applied in various aspects of production and living for its favorable characteristics such as high efficiency in space utilization, low power consumption, radiationless and low disturbance of electromagnetism etc.

In the conventional design of the LCD devices, single-sided LCD are adopted. For applications that require display in both sides, two single-sided LCD devices used in a back to back manner are usually adopted. Regarding the design scheme of the two single-sided LCD devices combined in a back to back manner, it is certainly not a optimum solution no matter considered from a cost point of view or considered from a design point of view.

SUMMARY

To address the technical issue of the prior art described above, an objective of the present disclosure is to provide a dual-sided display device, which contains a light guide plate having at least a light incident side, and a first light exit surface and a second light exit surface connected to the light incident side respectively and disposed opposite to each other; a light source disposed adjacent to the light incident side; a first liquid crystal panel disposed opposite to the first light exit surface, wherein a first lower polarizer of the first liquid crystal panel faces the first light exit surface; a second liquid crystal panel disposed opposite to the second light exit surface, wherein a second upper polarizer of the second liquid crystal panel faces the second light exit surface; and a reflective Dual Brightness Enhancement Film (DBEF) disposed between the first lower polarizer and the first light exit surface, wherein a direction of light transmission axis of the reflective DBEF is in parallel with a direction of light transmission axis of the first lower polarizer, and the direction of light transmission axis of the reflective DBEF is perpendicular to the direction of light transmission axis of the second upper polarizer.

Further, the direction of light transmission axis of reflective DBEF and the direction of light transmission axis of the first lower polarizer are both 0°, and the direction of light transmission axis of the second upper polarizer is 90°.

Further, the direction of light transmission axis of reflective DBEF and the direction of light transmission axis of the first lower polarizer are both 90°, and the direction of light transmission axis of the second upper polarizer is 0°.

Further, the direction of light transmission axis of reflective DBEF and the direction of light transmission axis of the first lower polarizer are both 45°, and the direction of light transmission axis of the second upper polarizer is 135°.

Further, the direction of light transmission axis of reflective DBEF and the direction of light transmission axis of the first lower polarizer are both 135°, and the direction of light transmission axis of the second upper polarizer is 45°.

Further, the direction of light transmission axis of the first upper polarizer of the first liquid crystal panel is perpendicular to the direction of light transmission axis of the first lower polarizer.

Further, the direction of light transmission axis of the second lower polarizer of the second liquid crystal panel is perpendicular to the the direction of light transmission axis of the second upper polarizer.

Another objective of the present disclosure is to provide a backlight module for a dual-sided liquid crystal display device, which contains a light guide plate having at least a light incident side, and a first light exit surface and a second light exit surface connected to the light incident side respectively and disposed opposite to each other; a light source disposed adjacent to the light incident side; and a reflective Dual Brightness Enhancement Film (DBEF) disposed on the first light exit surface, wherein when the first light exit surface is positioned opposite to the first liquid crystal panel, and the second light exit surface is positioned opposite to the second liquid crystal panel, a direction of light transmission axis of reflective DBEF is in parallel with a direction of light transmission axis of the first lower polarizer of the first liquid crystal panel, and the direction of light transmission axis of reflective DBEF is perpendicular to the direction of light transmission axis of the second upper polarizer of the second liquid crystal panel.

Further, the direction of light transmission axis of reflective DBEF may be 0°, 90°, 45° or 135°.

Advantageous effects of the present disclosure are as follows: by means of the double-sided liquid crystal display device provided in the present disclosure can not only enhance light availability, but also save cost.

BRIEF DESCRIPTION OF THE DRAWINGS

These and/or other aspects, characteristics and advantages of the embodiments in the present disclosure will become apparent and more readily appreciated from the following description, taken in conjunction with the accompanying drawings in which.

DETAILED DESCRIPTION OF EXEMPLARY EMBODIMENTS

Figure 1:
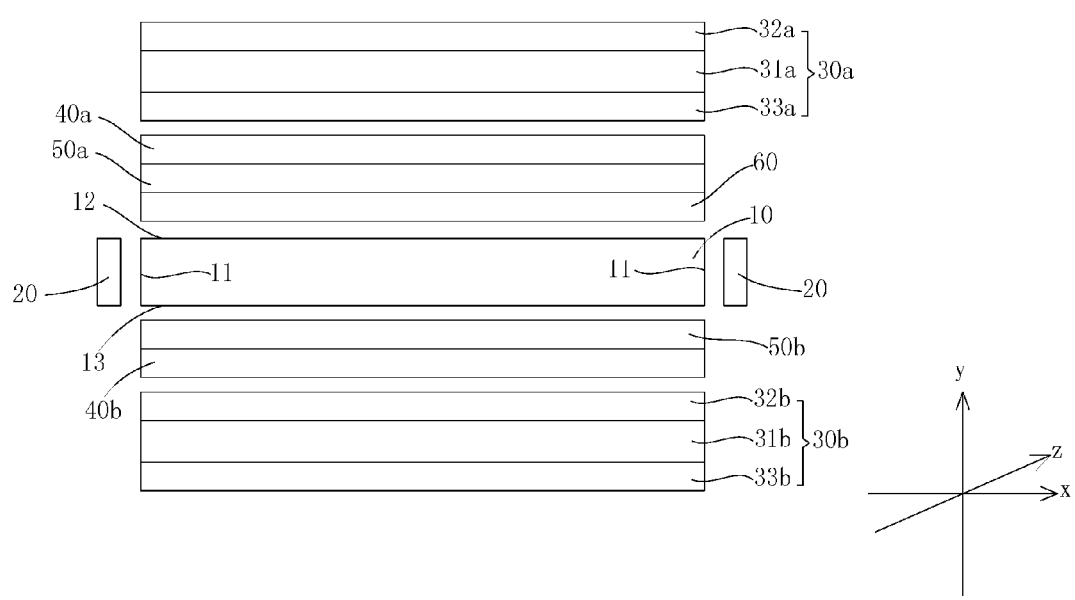
FIG. 1 is a structural schematic diagram of a double-sided liquid crystal display device according to an embodiment of the present disclosure.

Embodiments of the present disclosure will be described in detail below by referring to the accompany drawings. However, the present disclosure can be implemented in numerous different forms, and the present disclosure may not be explained to be limited hereto. Instead, these embodiments are provided for explaining the principle and actual application of the present disclosure, thus other skilled in the art can understand various embodiments and amendments which are suitable for specific intended applications of the present disclosure.

The drawings may also exaggerate the thickness of some layer or region for clarity's sake. The same reference number always refers to the same element in the drawings.

It should be understood that although the terms "first" and "second" may be used to describe various kinds of elements, these elements should not be limited thereto. These terms are merely used to distinguish one element from another one.

FIG. 1 is a structural schematic diagram of a double-sided liquid crystal display device according to an embodiment of the present disclosure.

Referring to FIG. 1, the double-sided liquid crystal display device according to an embodiment of the present disclosure may include a light guide plate 10, a light source 20, a first liquid crystal panel 30a, a second liquid crystal panel 30b, a first diffusion sheet 40a, a second diffusion sheet 40b, a first prism sheet 50a, a second prism sheet 50b and a reflective Dual Brightness Enhancement Film (or reflective polarizer) DBEF 60.

In the present embodiment, the light guide plate 10 includes two light incident sides 11 positioned opposite, and a first light exit surface 12 and a second light exit surface 13 connected to the light incident sides 11 respectively and positioned opposite to each other. Wherein, the first light exit surface 12 is a top surface of the light guide plate 10, the second light exit surface 13 is a bottom surface of the light guide plate 10, and the light incident sides 11 are side surfaces for connecting the the top surface and the bottom surface, but the present disclosure is not limited thereto.

One light source 20 is disposed adjacent to each of the light incident sides 11, i.e., the double-sided liquid crystal display device in the present embodiment has two light sources 20. Herein, the light source 20 may be a light emitting diode LED, but the present disclosure is not limited thereto. To clarity, in the present embodiment, one light source 20 may also be provided at a position adjacent to only one light entry face 11.

The first liquid crystal panel 30a is disposed opposite to the first light exit surface 12. The first liquid crystal panel 30a includes a first liquid crystal box 31a formed when cassettes of the above color filter substrate and the below TFT array substrate are disposed opposite to each other, a first upper polarizer 32a disposed over the first liquid crystal box 31a (namely, disposed over the color filter substrate), and a first lower polarizer 33a disposed below the first liquid crystal box 31a (namely, disposed below the TFT array substrate). Thus, the first lower polarizer 33a faces or is faced with the first light exit surface 12.

The first diffusion sheet 40a, the first prism sheet 50a and the reflective Dual Brightness Enhancement Film are sequentially disposed between the first lower polarizer 33a and the first light exit surface 12 in a direction from the first liquid crystal panel 30a toward the first light exit surface 12. It is noted that: in the present disclosure, the order for disposing the first diffusion sheet 40a, the first prism sheet 50a and the reflective DBEF 60 is not limited in FIG. 1, an adaptive adjustment can be made according to actual circumstances.

The second liquid crystal panel 30b is disposed opposite to the second light exit surface 13. The second liquid crystal panel 30b includes a second liquid crystal box 31b formed when cassettes of the above color filter substrate and the below TFT array substrate are disposed opposite to each other, a second upper polarizer 32b disposed over the second liquid crystal box 31b (namely, disposed over the color filter substrate), and a second lower polarizer 33b disposed below the second liquid crystal box 31b (namely, disposed below the TFT array substrate). Thus, the second upper polarizer 32b faces or is faced with the second light exit surface 13.

The second diffusion sheet 40b and the second prism sheet 50b are sequentially disposed between the second upper polarizer 32b and the second light exit surface 13 in a direction from the second liquid crystal panel 30b toward the second light exit surface 13. It is noted that: in the present disclosure, the order for disposing the second diffusion sheet 40b and the second prism sheet 50b is not limited in FIG. 1, an adaptive adjustment can be made according to actual circumstances.

Further, in the present embodiment, a direction of light transmission axis of reflective DBEF 60 is in parallel with a direction of light transmission axis of the first lower polarizer 33a, and the direction of light transmission axis of reflective DBEF 60 is perpendicular to the direction of light transmission axis of the second upper polarizer 32b. For example, in the present embodiment, the direction of light transmission axis of the reflective DBEF 60 (namely, x direction in FIG. 1) and the direction of light transmission axis of the first lower polarizer 33a (namely, x direction in FIG. 1) are both 0°, while the direction of light transmission axis of the second upper polarizer 32b (namely, z direction in FIG. 1) is 90°.

In addition, the direction of light transmission axis of the first upper polarizer 32a is perpendicular to the direction of light transmission axis of the first lower polarizer 33a. The direction of light transmission axis of the second upper polarizer 32b is perpendicular to the direction of light transmission axis of the second lower polarizer 33b.

If the light exited from the first light exit surface 12 includes a first polarized light vibrating along the x direction and a second polarized light vibrating along the z direction. When the light emitted from the first light exit surface 12 passing through the reflective DBEF 60, only the first polarized light would pass through the DBEF 60, and the second polarized light would be reflected back to the light guide plate 10 through the first light exit surface 12. The first polarized light passed through the DBEF 60 may get to the first liquid crystal box 31a through the first lower polarizer 33a. The vibration direction of the second polarized light which is reflected back to the light guide plate 10 is the same as the direction of light transmission axis of the second upper polarizer 32b, thus the second polarized light can get to the second liquid crystal box 31b through the second upper polarizer 32b. Thus, the light availability can be enhanced by using the double-sided liquid crystal display device, and only a reflective DBEF is used in the double-sided liquid crystal device, thus the cost can be saved.

As another embodiment, a direction of light transmission axis of reflective DBEF 60 is in parallel with a direction of light transmission axis of the first lower polarizer 33a, and the direction of light transmission axis of reflective DBEF 60 is perpendicular to the direction of light transmission axis of the second upper polarizer 32b. For example, in the present embodiment, the direction of light transmission axis of the reflective DBEF 60 (namely, z direction in FIG. 1) and the direction of light transmission axis of the first lower polarizer 33a (namely, z direction in FIG. 1) are both 90°, while the direction of light transmission axis of the second upper polarizer 32b (namely, x direction in FIG. 1) is 0°.

In addition, the direction of light transmission axis of the first upper polarizer 32a is perpendicular to the direction of light transmission axis of the first lower polarizer 33a. The direction of light transmission axis of the second upper polarizer 32b is perpendicular to the direction of light transmission axis of the second lower polarizer 33b.

If the light emitted from the first light exit surface 12 includes a second polarized light vibrating along the z direction and a first polarized light vibrating along the x direction. When the light emitted from the first light exit surface 12 passing through the DBEF 60, only the second polarized light would pass through the DBEF 60, and the first polarized light would be reflected back to the light guide plate 10 through the first light exit surface 12. The second polarized light passed through the DBEF 60 may get to the first liquid crystal box 31a through the first lower polarizer 33a. The vibration direction of the first polarized light which is reflected back to the light guide plate 10 is the same as the direction of light transmission axis of the second upper polarizer 32b, thus the first polarized light can get to the second liquid crystal box 31b through the second upper polarizer 32b. Thus, the light availability can be enhanced by using the double-sided liquid crystal display device, and only a DBEF is used in the double-sided liquid crystal device, thus the cost can be saved.

Figure 2:
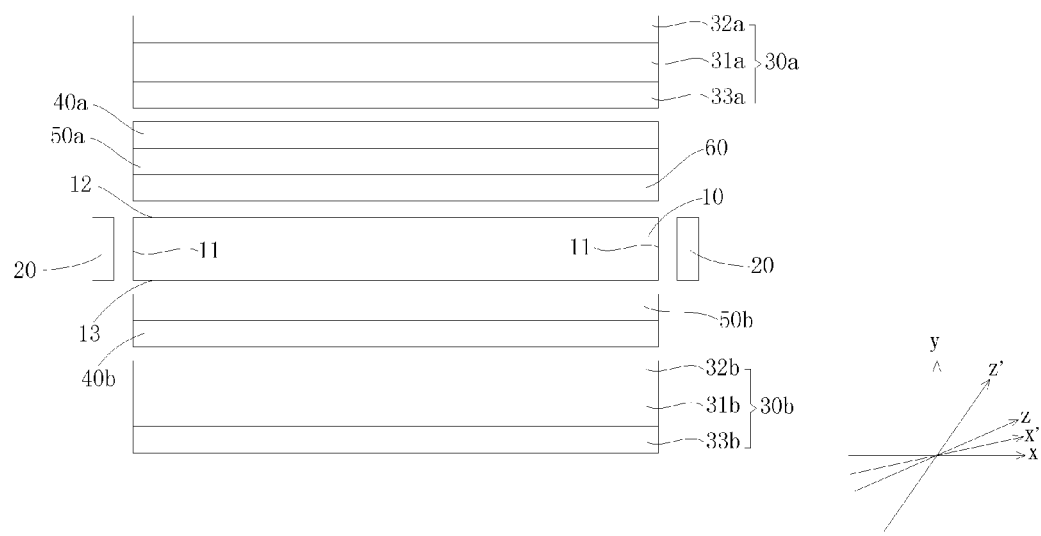
FIG. 2 is a structural schematic diagram of a double-sided liquid crystal display device according to another embodiment of the present disclosure.

FIG. 2 is a structural schematic diagram of a double-sided liquid crystal display device according to another embodiment of the present disclosure.

Referring to FIG. 2, the double-sided liquid crystal display device shown in FIG. 2 differs from the above mentioned double-sided liquid crystal display device in the following aspects:

a direction of light transmission axis of reflective DBEF 60 is in parallel with a direction of light transmission axis of the first lower polarizer 33a, and the direction of light transmission axis of DBEF 60 is perpendicular to the direction of light transmission axis of the second upper polarizer 32b. For example, in the present embodiment, the direction of light transmission axis of the DBEF 60 (namely, x' direction in FIG. 2) and the direction of light transmission axis of the first lower polarizer 33a (namely, x' direction in FIG. 2) are both 45°, while the direction of light transmission axis of the second upper polarizer 32b (namely, z' direction in FIG. 2) is 135°.

In addition, the direction of light transmission axis of the first upper polarizer 32a is perpendicular to the direction of light transmission axis of the first lower polarizer 33a. The direction of light transmission axis of the second upper polarizer 32b is perpendicular to the direction of light transmission axis of the second lower polarizer 33b.

If the light emitted from the first light exit surface 12 includes a third polarized light vibrating in the x' direction and a fourth polarized light vibrating in the z' direction. When the light emitted from the first light exit surface 12 passing through the DBEF 60, only the third polarized light would pass through the DBEF 60, and the fourth polarized light would be reflected back to the light guide plate 10 through the first light exit surface 12. The third polarized light passed through the DBEF 60 can get to the first liquid crystal box 31a through the first lower polarizer 33a. The vibration direction of the fourth polarized light which is reflected back to the light guide plate 10 is the same as the direction of light transmission axis of the second upper polarizer 32b, thus the fourth polarized light can get to the second liquid crystal box 31b through the second upper polarizer 32b. Thus, the light availability of the double-sided liquid crystal display device can be enhanced, and only a reflective DBEF is used in the double-sided liquid crystal device, thus the cost can be saved.

As another embodiment, a direction of light transmission axis of DBEF 60 is in parallel with a direction of light transmission axis of the first lower polarizer 33a, and the direction of light transmission axis of DBEF 60 is perpendicular to the direction of light transmission axis of the second upper polarizer 32b. For example, in the present embodiment, the direction of light transmission axis of the DBEF 60 (namely, z' direction in FIG. 1) and the direction of light transmission axis of the first lower polarizer 33a (namely, z' direction in FIG. 1) are both 135°, while the direction of light transmission axis of the second upper polarizer 32b (namely, x' direction in FIG. 1) is 45°.

In addition, the direction of light transmission axis of the first upper polarizer 32a is perpendicular to the direction of light transmission axis of the first lower polarizer 33a. The direction of light transmission axis of the second upper polarizer 32b is perpendicular to the direction of light transmission axis of the second lower polarizer 33b.

If the light emitted from the first light exit surface 12 includes a fourth polarized light vibrating along the z' direction and a third polarized light vibrating along the x' direction. When the light emitted from the first light exit surface 12 passing through the DBEF 60, only the fourth polarized light would pass through the DBEF 60, and the third polarized light would be reflected back to the light guide plate 10 through the first light exit surface 12. The fourth polarized light passed through the DBEF 60 can get to the first liquid crystal box 31a through the first lower polarizer 33a. The vibration direction of the third polarized light which is reflected back to the light guide plate 10 is the same as the direction of light transmission axis of the second upper polarizer 32b, thus the third polarized light can get to the second liquid crystal box 31b through the second upper polarizer 32b. Thus, the light availability of the double-sided liquid crystal display device can be enhanced, and only a DBEF is used in the double-sided liquid crystal device, thus the cost can be saved.

Although the present disclosure is described with reference to the special embodiments, while those skilled in the art will understand: various changes in form and details may be made therein without departing from the spirit and scope of the disclosure as defined by the appended claims and its equivalents.

The invention claimed is:

1. A double-sided liquid crystal display device comprising,
   a light guide plate including at least a light incident side, a first light exit surface and a second light exit surface, wherein the first light exit surface and the second light exit surface being connected to the light incident side respectively and disposed opposite to each other;
   a light source disposed adjacent to the light incident side; and
   a first liquid crystal panel disposed opposite to the first light exit surface, wherein a first lower polarizer of the first liquid crystal panel faces the first light exit surface;
   a second liquid crystal panel disposed opposite to the second light exit surface, wherein a second upper polarizer of the second liquid crystal panel faces the second light exit surface; and
   a reflective Dual Brightness Enhancement Film disposed between the first lower polarizer and the first light exit surface,
   a first diffusion sheet, a first prism sheet, a second diffusion sheet, and a second prism sheet,
   wherein the number of reflective Dual Brightness Enhancement Film is only one, the first diffusion sheet, the first prism sheet and the reflective Dual Brightness Enhancement Film are disposed between the first lower polarizer and the first light exit surface, the second diffusion sheet and the second prism sheet are disposed between the second upper polarizer and the second light exit surface, a direction of light transmission axis of reflective Dual Brightness Enhancement Film is in parallel with a direction of light transmission axis of the first lower polarizer, and the direction of light transmission axis of reflective Dual Brightness Enhancement Film is perpendicular to the direction of light transmission axis of the second upper polarizer.

2. The double-sided liquid crystal display device of claim 1, wherein the direction of light transmission axis of reflective Dual Brightness Enhancement Film and the direction of light transmission axis of the first lower polarizer are both 0°, and the direction of light transmission axis of the second upper polarizer is 90°.

3. The double-sided liquid crystal display device of claim 2, wherein the direction of light transmission axis of a first upper polarizer of the first liquid crystal panel is perpendicular to the direction of light transmission axis of the first lower polarizer.

4. The double-sided liquid crystal display device of claim 2, wherein the direction of light transmission axis of a second lower polarizer of the second liquid crystal panel is perpendicular to the direction of light transmission axis of the second upper polarizer.

5. The double-sided liquid crystal display device of claim 1, wherein the direction of light transmission axis of reflective Dual Brightness Enhancement Film and the direction of light transmission axis of the first lower polarizer are both 90°, and the direction of light transmission axis of the second upper polarizer is 0°.

6. The double-sided liquid crystal display device of claim 5, wherein the direction of light transmission axis of a first upper polarizer of the first liquid crystal panel is perpendicular to the direction of light transmission axis of the first lower polarizer.

7. The double-sided liquid crystal display device of claim 5, wherein the direction of light transmission axis of a second lower polarizer of the second liquid crystal panel is perpendicular to the direction of light transmission axis of the second upper polarizer.

8. The double-sided liquid crystal display device of claim 1, wherein the direction of light transmission axis of reflective Dual Brightness Enhancement Film and the direction of light transmission axis of the first lower polarizer are both 45°, and the direction of light transmission axis of the second upper polarizer is 135°.

9. The double-sided liquid crystal display device of claim 8, wherein the direction of light transmission axis of a first upper polarizer of the first liquid crystal panel is perpendicular to the direction of light transmission axis of the first lower polarizer.

10. The double-sided liquid crystal display device of claim 8, wherein the direction of light transmission axis of a second lower polarizer of the second liquid crystal panel is perpendicular to the direction of light transmission axis of the second upper polarizer.

11. The double-sided liquid crystal display device of claim 1, wherein the direction of light transmission axis of reflective Dual Brightness Enhancement Film and the direction of light transmission axis of the first lower polarizer are both 135°, and the direction of light transmission axis of the second upper polarizer is 45°.

12. The double-sided liquid crystal display device of claim 11, wherein the direction of light transmission axis of a first upper polarizer of the first liquid crystal panel is perpendicular to the direction of light transmission axis of the first lower polarizer.

13. The double-sided liquid crystal display device of claim 11, wherein the direction of light transmission axis of a second lower polarizer of the second liquid crystal panel is perpendicular to the direction of light transmission axis of the second upper polarizer.

14. The double-sided liquid crystal display device of claim 1, wherein the direction of light transmission axis of a first upper polarizer of the first liquid crystal panel is perpendicular to the direction of light transmission axis of the first lower polarizer.

15. The double-sided liquid crystal display device of claim 1, wherein the direction of light transmission axis of a second lower polarizer of the second liquid crystal panel is perpendicular to the direction of light transmission axis of the second upper polarizer.

16. A backlight module for a double-sided liquid crystal display device comprising,
a light guide plate including at least a light incident side, a first light exit surface and a second light exit surface, the first light exit surface and the second light exit surface being connected to the light incident side respectively and disposed opposite to each other;
a light source disposed adjacent to the light incident side; and
a reflective Dual Brightness Enhancement Film disposed on the first light exit surface,
a first diffusion sheet, a first prism sheet, a second diffusion sheet, and a second prism sheet,
wherein the number of reflective Dual Brightness Enhancement Film is only one, the first diffusion sheet, the first prism sheet and the reflective Dual Brightness Enhancement Film are disposed between the first lower polarizer and the first light exit surface, the second diffusion sheet and the second prism sheet are disposed between the second upper polarizer and the second light exit surface, when the first light exit surface is disposed opposite to a first liquid crystal panel, and the second light exit surface is disposed opposite to a second liquid crystal panel, a direction of light transmission axis of the reflective Dual Brightness Enhancement Film is in parallel with a direction of light transmission axis of a first lower polarizer of the first liquid crystal panel, and the direction of light transmission axis of reflective Dual Brightness Enhancement Film is perpendicular to the direction of light transmission axis of a second upper polarizer of the second liquid crystal panel.

17. The backlight module of claim 16, wherein the direction of light transmission axis of reflective Dual Brightness Enhancement Film is 0°, 90°, 45° or 135°.

* * * * *